US012482407B2

(12) United States Patent
Liu

(10) Patent No.: US 12,482,407 B2
(45) Date of Patent: Nov. 25, 2025

(54) DISPLAY PANEL AND DRIVING METHOD THEREOF AND DISPLAY DEVICE

(71) Applicant: Wuhan Tianma Micro-Electronics Co., Ltd., Wuhan (CN)

(72) Inventor: Sheng Liu, Wuhan (CN)

(73) Assignee: Wuhan Tianma Micro-Electronics Co., Ltd., Wuhan (CN)

( * ) Notice: Subject to any disclaimer, the term of this patent is extended or adjusted under 35 U.S.C. 154(b) by 0 days.

(21) Appl. No.: 18/576,398

(22) PCT Filed: Nov. 8, 2022

(86) PCT No.: PCT/CN2022/130498

§ 371 (c)(1), (2) Date: Jan. 4, 2024

(87) PCT Pub. No.: WO2024/055401

PCT Pub. Date: Mar. 21, 2024

(65) Prior Publication Data

US 2025/0201170 A1 Jun. 19, 2025

(30) Foreign Application Priority Data

Sep. 13, 2022 (CN) ......................... 202211110896.X

(51) Int. Cl.
*G09G 3/32* (2016.01)

(52) U.S. Cl.
CPC ......... *G09G 3/32* (2013.01); *G09G 2300/043* (2013.01); *G09G 2300/0819* (2013.01); *G09G 2310/061* (2013.01); *G09G 2310/08* (2013.01); *G09G 2330/021* (2013.01)

(58) Field of Classification Search
None
See application file for complete search history.

(56) References Cited

U.S. PATENT DOCUMENTS

2017/0270853 A1* 9/2017 Xiang .................. G09G 3/3258
2024/0074268 A1* 2/2024 Huang ................... H10K 59/35

FOREIGN PATENT DOCUMENTS

| | | | | |
|---|---|---|---|---|
| CN | 106710529 A | 5/2017 | | |
| CN | 110824797 A | 2/2020 | | |
| CN | 111710299 A | 9/2020 | | |
| CN | 113950715 A | 1/2022 | | |
| CN | 114758624 A | 7/2022 | | |
| CN | 114927099 A | 8/2022 | | |
| WO | WO-2024031531 A1 * | 2/2024 | ............... | G09F 9/00 |

* cited by examiner

*Primary Examiner* — Ifedayo B Iluyomade
(74) *Attorney, Agent, or Firm* — KDW FIRM PLLC

(57) ABSTRACT

A display panel includes a first display region and a second display region, the first display region and the second display region each include multiple subpixels which are arranged in an array, and each subpixel includes a pixel driver circuit. The second display region corresponds to a photosensitive element. Each pixel driver circuit located in the second display region includes at least one transistor, and at least one transistor of the at least one transistor is a low-temperature polycrystalline oxide thin-film transistor.

20 Claims, 11 Drawing Sheets

Data signal terminal (Vdata)
PVDD
200
50
M7
M6
S1
N2
40
Cst
N1
M0
20
M1
N3
S1
M3
30
M2
Switch signal control terminal (Emit)
M4
10
N4
D1
Vref
PVEE

DISPLAY PANEL AND DRIVING METHOD THEREOF AND DISPLAY DEVICE

CROSS-REFERENCE TO RELATED APPLICATION(S)

This is a national stage application filed under 35 U.S.C. 371 based on International Patent Application NO. PCT/CN2022/130498, filed Nov. 8, 2022, which claims priority to Chinese Patent Application No. 202211110896.X filed with the China National Intellectual Property Administration (CNIPA) on Sep. 13, 2022, the disclosures of which is incorporated herein by reference in its entirety.

TECHNICAL FIELD

The present disclosure relates to the field of display technologies, for example, a display panel and a driving method thereof and a display device.

BACKGROUND

With the advancement of technologies, demands for large screens of consumers are increasing. Whether a notch screen, a waterdrop screen or a pop-up camera is used, the design goal is to increase the screen-to-body ratio of the display panel.

An under-screen display panel, which means that an optical element (such as a camera) is disposed under a display screen, is provided. When taking photos is needed, the display screen will become like transparent glass, allowing external light to pass through the display screen and reach the camera. When there is no need to take photos, the display screen can display normally. However, whether a liquid crystal display (LCD) device or an organic light-emitting diode (OLED) display device is used, the transmittance of the optical element region is difficult to improve.

SUMMARY

The present disclosure provides a display panel and a driving method thereof and a display device.

The present disclosure provides a display panel. The display panel includes a first display region and a second display region, where the first display region and the second display region each include multiple subpixels which are arranged in an array, and each subpixel includes a pixel driver circuit, where the second display region corresponds to a photosensitive element.

Each pixel driver circuit located in the second display region includes at least one transistor, and at least one transistor of the at least one transistor is a low-temperature polycrystalline oxide thin-film transistor.

The present disclosure further provides a driving method of a display panel for driving the preceding display panel.

The driving method includes steps described below.

In an initialization stage, a compensation module and a first reset module are turned on, and the first reset module and the compensation module transmit a reset signal of a reset signal terminal to a first node to reset the first node.

In a data write stage, a data write module, a drive transistor and the compensation module which are included in a pixel driver circuit are turned on, a data signal of a data signal terminal connected by a first terminal of the data write module is transmitted to a second node through a second terminal of the data write module, a signal of the second node is transmitted to a third node through the drive transistor, and a signal of the third node is transmitted to the first node through the compensation module.

In a light emission stage, a power supply voltage write module, the drive transistor and a light emission control module which are included in the pixel driver circuit are turned on, and the power supply voltage write module transmits a first voltage signal of a first power supply signal terminal to the second node and thus the drive transistor generates a current and transmits the current to a light-emitting element.

The present disclosure further provides a display device. The display device includes the preceding display panel provided in the present disclosure.

DETAILED DESCRIPTION

Figure 1:
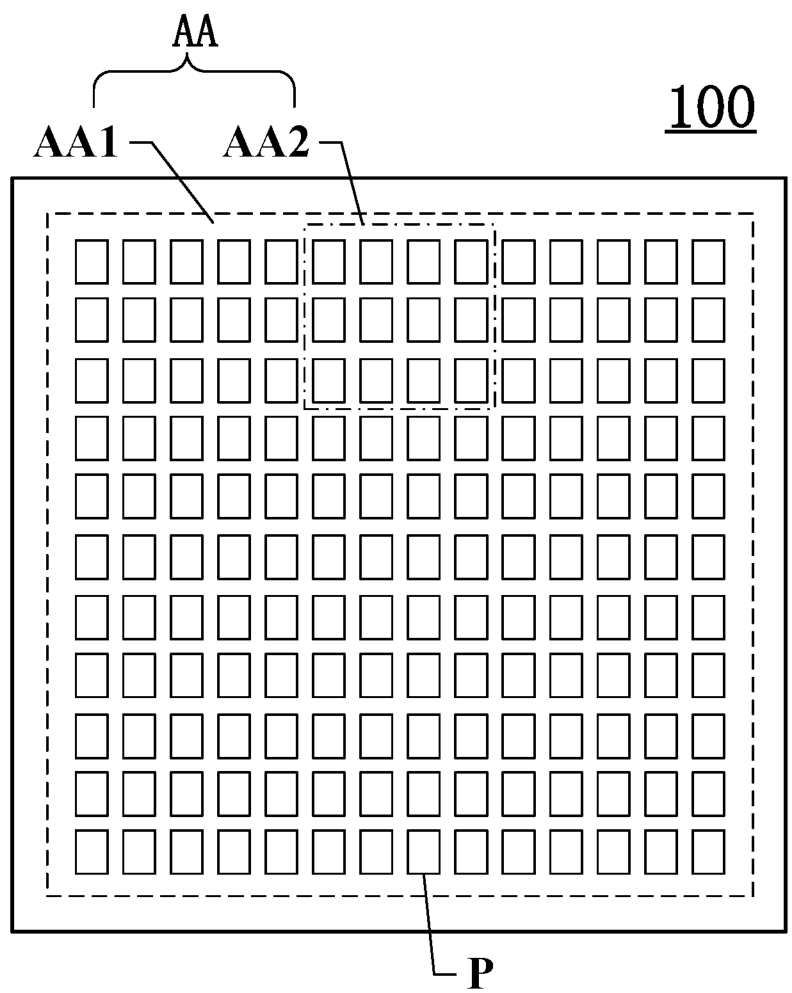
FIG. 1 is a top view of a display panel according to an embodiment of the present disclosure.

At least one example embodiment of the present disclosure is described with reference to the drawings. Relative arrangements of components and steps, numerical expressions and numerical values set forth in these embodiments do not limit the scope of the present disclosure unless otherwise indicated.

The following description of at least one example embodiment is illustrative in nature and is not intended to limit the present disclosure or an application or use thereof.

Known techniques, methods and devices may not be discussed, but in appropriate cases, such techniques, methods and devices should be considered part of the specification.

In all examples shown and discussed herein, any specific values are to be construed as exemplary and non-limiting. Therefore, other examples of the example embodiments may have different values.

Similar reference numerals and letters represent similar items in the following drawings. Therefore, once a particular item is defined in a drawing, the item does not need to be discussed in subsequent drawings.

Figure 2:
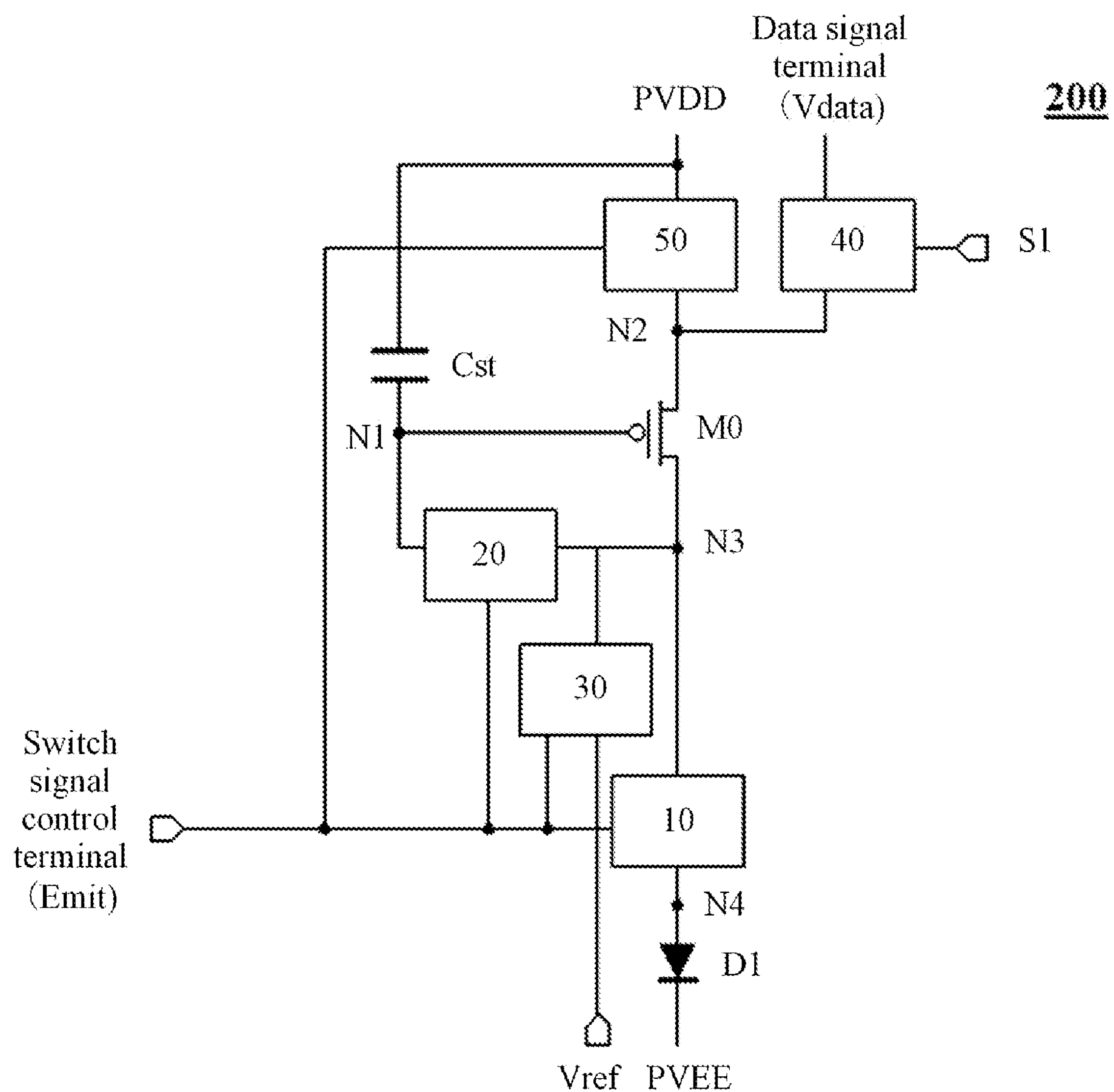
FIG. 2 is a diagram illustrating the frame structure of a pixel driver circuit according to an embodiment of the present disclosure.

FIG. 1 is a top view of a display panel 100 according to an embodiment of the present disclosure. FIG. 2 is a structural diagram of a pixel driver circuit 200 according to an embodiment of the present disclosure. Referring to FIG. 1 and FIG. 2, the display panel 100 includes a first display region AA1 and a second display region AA2, the first display region AA1 and the second display region AA2 each include multiple subpixels P which are arranged in an array, and a subpixel P includes a pixel driver circuit 200. The second display region AA2 corresponds to a photosensitive element G.

A pixel driver circuit 200 located in the second display region AA2 includes at least one transistor, and at least some transistors of the at least one transistor are low-temperature polycrystalline oxide thin-film transistors.

An example where the top-view structure of the display panel 100 is a rectangle is used for illustrating the display panel 100 in the present disclosure in FIG. 1, and the actual shape of the display panel 100 is not limited. In some other embodiments of the present disclosure, the shape of the top-view structure of the display panel 100 may also be embodied as a rounded rectangle, a circle, an ellipse or a special shape including an arc structure, which is not limited in the present disclosure.

The display panel 100 provided in the embodiment of the present disclosure includes the first display region AA1 and the second display region AA2. The second display region AA2 corresponds to the photosensitive element G. In an embodiment, the photosensitive element G includes an electronic photosensitive device such as a camera, an infrared sensing device and a fingerprint recognition device. When the second display region AA2 is disposed in the display region AA, the second display region AA2 does not need to occupy the space of the non-display region, which is conducive to improving the screen-to-body ratio of the display panel. An example where a camera is disposed in the second display region AA2 is illustrated. During the normal display, the second display region AA2 can play a display role; when taking photos or shooting videos is needed, the camera takes photos or shoots videos through the second display region AA2, so that the second display region AA2 can achieve both of the display and shooting functions.

Widely used panel technologies include the low-temperature poly-silicon (LTPS) technology. A low-temperature poly-silicon thin-film transistor (LTPS-TFT) has characteristics such as fast reaction speed and high electron mobility. However, the LTPS-TFT has relatively low transmittance. When more low-temperature poly-silicon transistors are arranged in the second display region AA2 corresponding to the photosensitive element G, it is difficult to improve the transmittance of the second display region AA2.

In view of this, in the display panel 100 provided in the embodiment of the present disclosure, at least some low-temperature polycrystalline oxide (LTPO) thin-film transistors are arranged in the second display region AA2 corresponding to the photosensitive element G, that is, at least some transistors in the pixel driver circuit 200 disposed in the second display region AA2 use low-temperature polycrystalline oxide thin-film transistors. Compared with low-temperature poly-silicon transistors, low-temperature polycrystalline oxide thin-film transistors have higher transmittance. Therefore, applying low-temperature polycrystalline oxide thin-film transistors to the second display region AA2 is conducive to improving the transmittance of the second display region AA2, improving the photosensitive performance of the display panel 100 in a photosensitive stage, and thus improving the user experience.

FIG. 1 only shows the case where the display panel 100 includes one second display region AA2. In some other embodiments of the present disclosure, two or more second display regions AA2 may be disposed in the display panel 100 according to requirements, which is not limited in the present disclosure. The embodiment only illustrates an example where the display panel 100 includes one second display region AA2; if the display panel 100 includes two or more second display regions AA2, reference may be made to the embodiments of the present disclosure. FIG. 1 only shows the case where the first display region AA1 partially surrounds the second display region AA2. In some other embodiments of the present disclosure, the first display region AA1 may also fully surround the second display region AA2. FIG. 1 only shows a relative positional relationship between the first display region AA1 and the second region AA2 in the display panel 100. In some other embodiments of the present disclosure, the second display region AA2 is located at another position in the display panel 100, which is not limited in the present disclosure. In addition, the case where the shape of the second display region AA2 in FIG. 1 is a rectangle is only for illustration. In some other embodiments of the present disclosure, the second display region AA2 may be embodied as other shapes such as a circle or an ellipse, and the dimension of the second display region AA2 may be set according to actual requirements, which is not limited in the present disclosure.

In some embodiments of the present disclosure, the pixel driver circuit 200 includes a first power supply signal terminal PVDD, a second power supply signal terminal PVEE, a drive transistor M0, a light-emitting element D1, a light emission control module 10, a compensation module 20 and a first reset module 30.

The first power supply signal terminal PVDD is configured to receive a first voltage signal, and the second power supply signal terminal PVEE is configured to receive a second voltage signal.

A gate of the drive transistor M0 is connected to a first node N1, a first electrode of the drive transistor M0 is connected to a second node N2, and a second electrode of the drive transistor M0 is connected to a third node N3; the drive transistor M0 is configured to provide a drive current in a light emission stage.

A first terminal of the light-emitting element D1 is connected to a fourth node N4, and a second terminal of the light-emitting element D1 is connected to the second power supply signal terminal PVEE; the light-emitting element D1 is configured to emit light in response to the drive current.

A control terminal of the light emission control module 10 is connected to a switch signal control terminal Emit, a first terminal of the light emission control module 10 is connected to the third node N3, and a second terminal of the light emission control module 10 is connected to the first terminal of the light-emitting element D1; the light emission control module 10 is configured to turn off or turn on the light-emitting element D1.

A control terminal of the compensation module 20 is connected to the switch signal control terminal Emit, a first terminal of the compensation module 20 is connected to the first node N1, and a second terminal of the compensation module 20 is connected to the third node N3; in a compensation stage, the compensation module 20 is configured to detect and self-compensate for a deviation of a threshold voltage of the drive transistor M0.

A control terminal of the first reset module 30 is connected to the switch signal control terminal Emit, a first terminal of the first reset module 30 is connected to the third node N3, and a second terminal of the first reset module 30 is connected to a reset signal terminal Vref; in an initialization stage, the first reset module 30 and the compensation module 20 are jointly configured to reset the first node N1.

FIG. 2 only shows a framework structure of the pixel driver circuit 200 in the embodiment. In some other embodiments of the present disclosure, the framework structure of the pixel driver circuit 200 may also be embodied as others, which is not limited in the present disclosure.

The pixel driver circuit 200 provided in the embodiment of the present disclosure includes the drive transistor M0, the light-emitting element D1 and the light emission control module 10. The drive transistor M0 is configured to provide a drive current for the light-emitting element D1 in the light emission stage. The light-emitting element D1 is configured to, in response to the drive current, emit light under the control of the light emission control module 10. In the embodiment, the control terminal of the compensation module 20 and the control terminal of the light emission control module 10 are both connected to the switch signal control terminal Emit. Therefore, it is not necessary to connect the compensation module 20 and the light emission control module 10 to different control terminals respectively, and thus the design of the pixel driver circuit 200 is simplified. In addition, the connection between the control terminal of the compensation module 20 and the switch signal control terminal Emit can also reduce the current leakage phenomenon of the first node N1 during the turn-on or turn-off switching process of the compensation module 20, which is conducive to keeping a potential of the first node N1 and ensuring the accuracy of light emission of the light-emitting element D1. In an embodiment, under the control of a control signal of the switch signal control terminal Emit, only one of the compensation module 20 and the light emission control module 10 is turned on. For example, in the compensation stage, the compensation module 20 is turned on, and the light emission control module 10 is turned off; in the light emission stage, the compensation module 20 is turned off and the light emission control module 10 is turned on.

In the embodiment of the present disclosure, the control terminal of the first reset module 30 is connected to the switch signal control terminal Emit. In the initialization stage, the first reset module 30 is turned on in response to a turn-on level of the switch signal control terminal Emit. In an embodiment, in the initialization stage, the first reset module 30 and the compensation module 20 are simultaneously turned on, and a signal of the reset signal terminal Vref is transmitted to the first node N1 through the first reset module 30 and the compensation module 20 to reset the first node N1. This connection of the first reset module 30 and this connection of the compensation module 20 can also reduce the current leakage phenomenon of the first node N1 during the turn-on or turn-off switching process of the first reset module 30 and the compensation module 20, for example, the current leakage from the first reset module 30 and the compensation module 20 to the first node N1 can be reduced, so that the potential of the first node N1 can be effectively kept.

In an embodiment, the first electrode of the drive transistor M0 is a source, and the second electrode of the drive transistor M0 is a drain. The source of the drive transistor M0 is connected to the second node N2, and the drain of the drive transistor M0 is connected to the third node N3. The second node N2 is connected to the first power supply signal terminal PVDD, and the third node N3 is connected to the light emission control module 10. In an embodiment, the light emission control module 10 is connected in series between the third node N3 and the light-emitting element D1, and the control terminal of the light emission control module 10 is connected to the switch signal control terminal Emit. The light emission control module 10 is turned on or turned off according to a signal of the switch signal control terminal Emit, thereby controlling the transmission of a current to the light-emitting element D1. In an embodiment, the light emission control module 10 is turned off when the control terminal of the light emission control module 10 receives a first level signal, and the light emission control module 10 is turned on when the control terminal of the light emission control module 10 receives a second level signal. The control terminal of the light emission control module 10 is connected to the switch signal control terminal Emit. In the initialization stage and a data write stage, the switch signal control terminal Emit outputs the first level signal, and the control terminal of the light emission control module 10 receives the first level signal, causing the light emission control module 10 to be turned off; thus a current cannot be transmitted to the light-emitting element D1 through the light emission control module 10 to drive the light-emitting element D1 to emit light. In the light emission stage, the switch signal control terminal Emit outputs the second level signal, and the control terminal of the light emission control module 10 receives the second level signal, causing the light emission control module 10 to be turned on; thus a current is transmitted to the light-emitting element D1 through the light emission control module 10 to drive the light-emitting element D1 to emit light.

Figure 3:
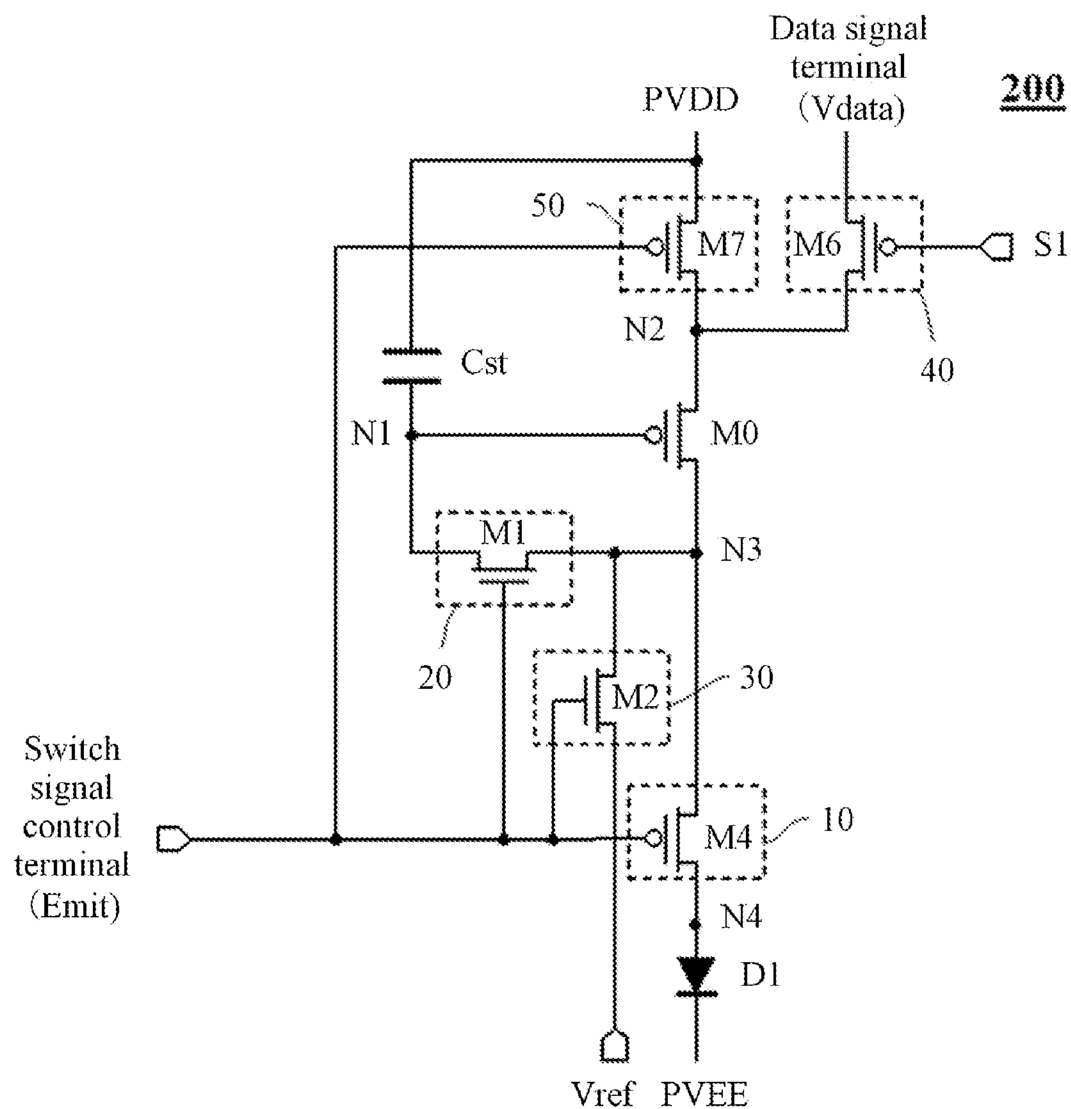
FIG. 3 is a circuit diagram of a pixel driver circuit according to an embodiment of the present disclosure.

FIG. 3 is a circuit diagram of a pixel driver circuit 200 according to an embodiment of the present disclosure. Referring to FIG. 3, in an embodiment of the present disclosure, the compensation module 20 includes a first transistor M1, a gate of the first transistor M1 is connected to the switch signal control terminal Emit, a first electrode of the first transistor M1 is connected to the first node N1, and a second electrode of the first transistor M1 is connected to the third node N3; the first transistor M1 is a low-temperature polycrystalline oxide thin-film transistor.

In the embodiment, the first transistor M1 in the compensation module 20 in the pixel driver circuit 200 is set as a low-temperature polycrystalline oxide thin-film transistor. In an embodiment, the low-temperature polycrystalline oxide thin-film transistor is turned on when the gate of the low-temperature polycrystalline oxide thin-film transistor receives a high-level signal, and the low-temperature polycrystalline oxide thin-film transistor is turned off when the gate of the low-temperature polycrystalline oxide thin-film transistor receives a low-level signal. The gate of the first transistor M1 is the control terminal of the compensation module 20, and the gate of the first transistor M1 is connected to the switch signal control terminal Emit.

In the embodiment of the present disclosure, when the first transistor M1 is used for composing the compensation module 20 in the present disclosure, the first transistor M1 uses a low-temperature polycrystalline oxide thin-film transistor. Due to the relatively high transmittance of the low-temperature polycrystalline oxide thin-film transistor, the transmittance of the second display region AA2 can be effectively improved while the threshold voltage of the drive transistor M0 is detected and self-compensated for. In a photosensitive stage, more light passes through the second display region AA2 to reach the photosensitive element G, which is conducive to improving the photosensitive performance of the display panel 100.

In an embodiment of the present disclosure, with continued reference to FIG. 3, the first reset module 30 includes a second transistor M2, a gate of the second transistor M2 is connected to the switch signal control terminal Emit, a first electrode of the second transistor M2 is connected to the third node N3, and a second electrode of the second transistor M2 is connected to the reset signal terminal Vref; the second transistor M2 is a low-temperature polycrystalline oxide thin-film transistor.

In an embodiment, if the second transistor M2 is a low-temperature polycrystalline oxide thin-film transistor, the low-temperature polycrystalline oxide thin-film transistor is turned on when the gate of the low-temperature polycrystalline oxide thin-film transistor receives a high-level signal, and the low-temperature polycrystalline oxide thin-film transistor is turned off when the gate of the low-temperature polycrystalline oxide thin-film transistor receives a low-level signal. The gate of the second transistor M2 is the control terminal of the first reset module 30, and the gate of the second transistor M2 is connected to the switch signal control terminal Emit. In the initialization stage of the pixel driver circuit 200, the switch signal control terminal Emit outputs a high-level signal, the gate of the second transistor M2 receives the high-level signal, thus the second transistor M2 is turned on, and the first transistor M1 is simultaneously turned on. A reset signal sent by the reset signal terminal Vref is written to the first node N1 through the second transistor M2 and the first transistor M1, so that the first node N1 is reset.

In the embodiment, the second transistor M2 is used for composing the first reset module 30 in the present disclosure, so that the first node N1 can be reset, a residual voltage of the first node N1 in the last time of light emission can be cleared, and thus the light-emitting element D1 can emit light at preset brightness, which is conducive to improving the accuracy of the light emission brightness of the light-emitting element D1. Moreover, when the second transistor M2 is turned on, the reset signal is written to the first node N1 through the first transistor M1, avoiding an excessive large leakage current of the first node N1 caused by the direct connection of the second transistor M2 to the first node N1, which is conducive to stabilizing the voltage of the first node N1. Moreover, the second transistor M2 is a low-temperature polycrystalline oxide thin-film transistor with characteristics such as high transmittance and low power consumption, so that the transmittance of the second display region AA2 can be improved. In the photosensitive stage, more light passes through the second display region AA2 to reach the photosensitive element G, which is conducive to improving the photosensitive performance of the display panel 100.

In an embodiment, if the first transistor M1 and the second transistor M2 both use low-temperature polycrystalline oxide thin-film transistors, the transmittance of the second display region AA2 can be further improved.

Figure 4:
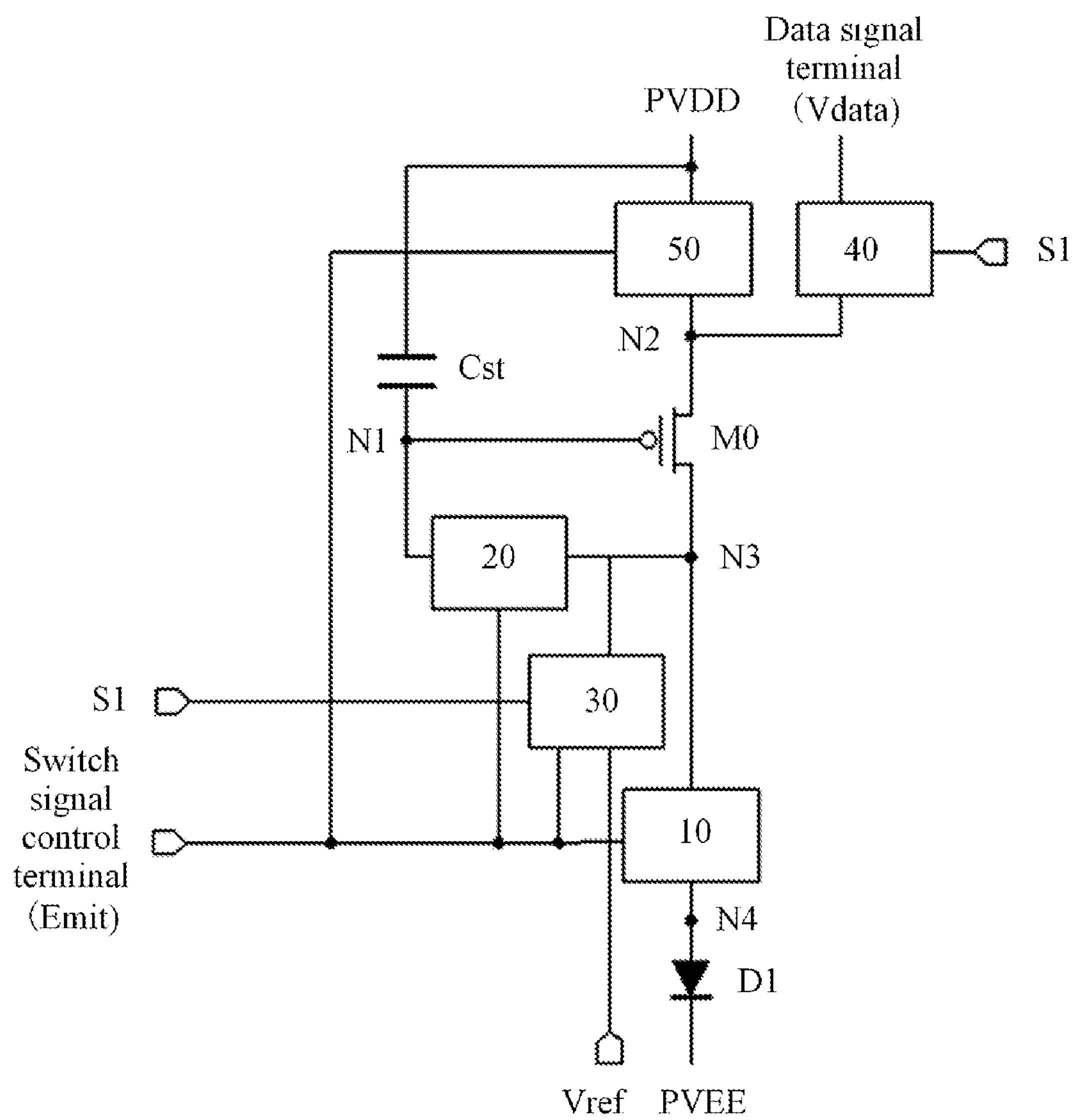
FIG. 4 is a diagram illustrating the frame structure of another pixel driver circuit according to an embodiment of the present disclosure.
Figure 5:
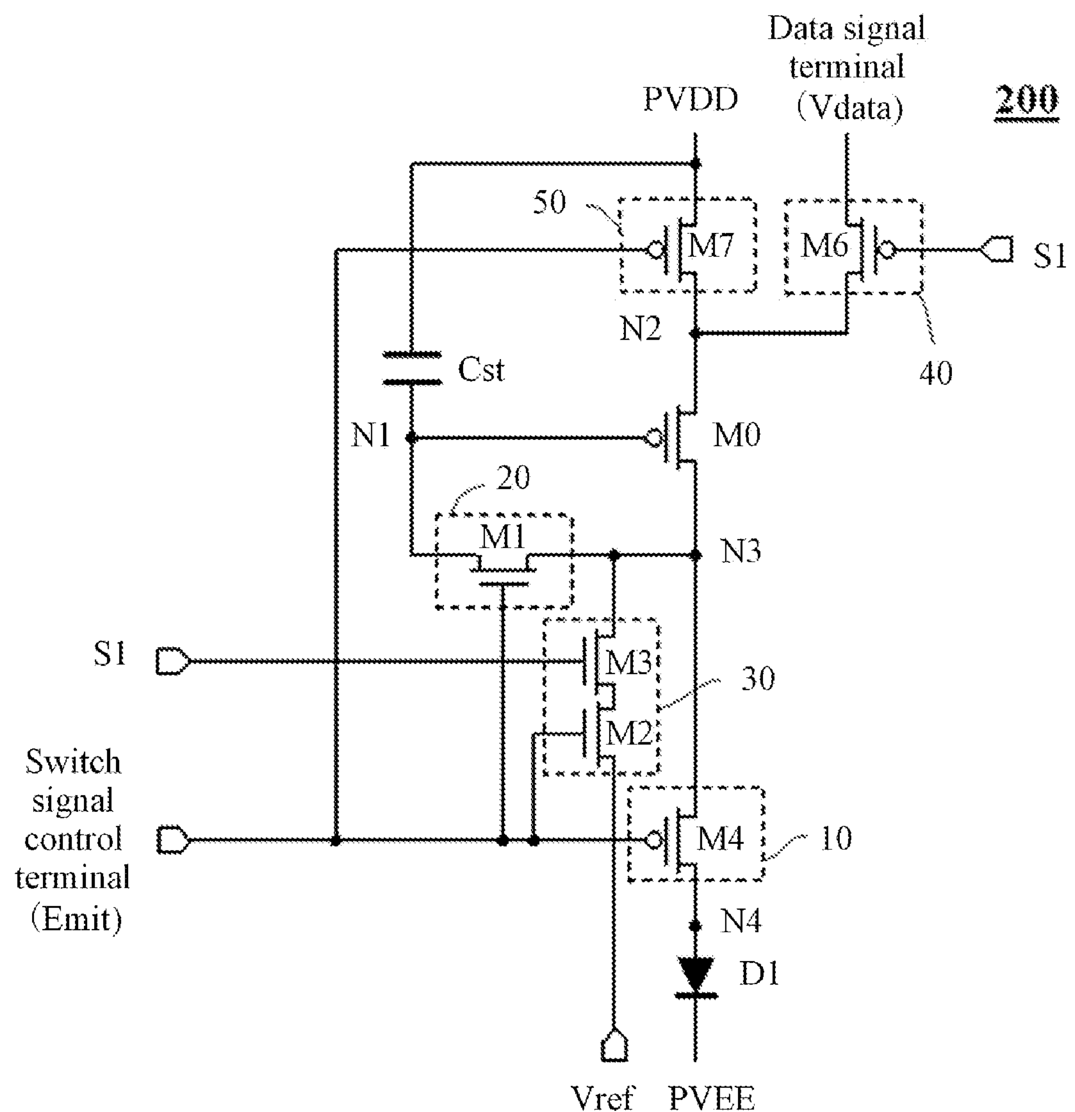
FIG. 5 is a circuit diagram of another pixel driver circuit according to an embodiment of the present disclosure.

FIG. 4 is a diagram illustrating the frame structure of another pixel driver circuit 200 according to an embodiment of the present disclosure, and FIG. 5 is a circuit diagram of another pixel driver circuit 200 according to an embodiment of the present disclosure. The embodiment shows another implementation of the first reset module 30. Referring to FIG. 4 and FIG. 5, in an embodiment of the present disclosure, the first reset module 30 further includes a third transistor M3, a gate of the third transistor M3 is connected to a first signal control terminal S1, a first electrode of the third transistor M3 is connected to the third node N3, and a second electrode of the third transistor M3 is connected to the first electrode of the second transistor M2; the third transistor M3 is a low-temperature polycrystalline oxide thin-film transistor.

In an embodiment, if the third transistor M3 is a low-temperature polycrystalline oxide thin-film transistor, the low-temperature polycrystalline oxide thin-film transistor is turned on when the gate of the low-temperature polycrystalline oxide thin-film transistor receives a high-level signal, and the low-temperature polycrystalline oxide thin-film transistor is turned off when the gate of the low-temperature polycrystalline oxide thin-film transistor receives a low-level signal. The gate of the third transistor M3 is connected to the first signal control terminal S1. In the initialization stage of the pixel driver circuit 200, the first signal control terminal S1 outputs a high-level signal, the gate of the third transistor M2 receives the high-level signal, thus the third transistor M3 is turned on, and simultaneously, the first transistor M1 and the second transistor M2 are turned on. A reset signal sent by the reset signal terminal Vref is written to the first node N1 through the second transistor M2, the third transistor M3 and the first transistor M1, so that the first node N1 is reset. In the data write stage of the pixel driver circuit 200, the first signal control terminal S1 outputs a low-level signal, the gate of the third transistor M3 receives the low-level signal, and thus the third transistor M3 is turned off to prevent the reset signal sent by the reset signal terminal Vref from continuing to be transmitted to the first node N1. In the embodiment, the third transistor M3 is a low-temperature polycrystalline oxide thin-film transistor with characteristics such as high transmittance and low power consumption, so that the transmittance of the second display region AA2 can be improved. In the photosensitive stage, more light passes through the second display region AA2 to reach the photosensitive element G, which is conducive to improving the photosensitive performance of the display panel 100.

With continued reference to FIG. 2 or FIG. 4, the pixel driver circuit 200 further includes a data write module 40, a control terminal of the data write module 40 is connected to the first signal control terminal S1, a first terminal of the data write module 40 is connected to a data signal terminal Vdata, and a second terminal of the data write module 40 is connected to the second node N2; the data write module 40 is configured to provide a data signal for the drive transistor M0.

In the embodiment of the present disclosure, the data write module 40 is connected in series between the data signal terminal Vdata and the second node N2, and the control terminal of the data write module 40 is connected to the first signal control terminal S1. The data write module 40 is turned on or turned off according to a signal of the first signal control terminal S1. When the data write module 40 is turned on, a data signal of the data signal terminal Vdata is transmitted to the second node N2 of the drive transistor M0 through the data write module 40. In the embodiment of the present disclosure, the first reset module 30 further includes the third transistor M3, and a control terminal of the third transistor M3 and the control terminal of the data write module 40 are both connected to the first signal control terminal S1, so that it is not necessary to introduce different signal control terminals for the third transistor M3 of the first reset module 30 and the data write module 40, which is conducive to simplifying the overall design of the display panel 100.

In an embodiment, the data write module 40 is turned off when the control terminal of the data write module 40 receives a high-level signal, and the data write module 40 is turned on when the control terminal of the data write module 40 receives a low-level signal. The control terminal of the data write module 40 is connected to the first signal control terminal S1. In the data write stage of the pixel driver circuit 200, the first signal control terminal S1 outputs a low-level signal, then the control terminal of the data writing module 40 receives the low-level signal, thus the data write module 40 is turned on, and a data signal is transmitted to the second node N2 through the data write module 40 so that the data signal is provided for the drive transistor M0. In the light emission stage, the drive transistor M0 generates a drive current for driving the light-emitting element D1 to emit light according to the data signal and a signal of the first power supply signal terminal PVDD.

In an embodiment of the present disclosure, referring to FIG. 3 or FIG. 5, the light emission control module 10 includes a fourth transistor M4, a gate of the fourth transistor M4 is connected to the switch signal control terminal Emit, a first electrode of the fourth transistor M4 is connected to the third node N3, and a second electrode of the fourth transistor M4 is connected to the first terminal of the light-emitting element D1.

In an embodiment, the fourth transistor M4 is a low-temperature poly-silicon thin-film transistor. In an embodiment, the fourth transistor M4 is a P-type transistor or an N-type transistor. If the fourth transistor M4 is a P-type transistor, the fourth transistor M4 is turned on when the gate of the fourth transistor M4 receives a low-level signal, and the fourth transistor M4 is turned off when the gate of the fourth transistor M4 receives a high-level signal; if the fourth transistor M4 is an N-type transistor, the fourth transistor M4 is turned on when the gate of the fourth transistor M4 receives a high-level signal, and the fourth transistor M4 is turned off when the gate of the fourth transistor M4 receives a low-level signal. The embodiments shown by FIG. 3 and FIG. 5 only illustrate examples where the fourth transistor M4 is a P-type transistor. In some other embodiments of the present disclosure, the fourth transistor M4 may be embodied as an N-type transistor, which is not limited in the present disclosure.

In the embodiment of the present disclosure, the fourth transistor M4 is used for composing the light emission control module 10 in the present disclosure, so that the structure is simple. Therefore, the circuit structure of the pixel driver circuit 200 is simplified while the light-emitting element D1 is turned on or turned off. Moreover, the fourth transistor M4 is a low-temperature poly-silicon thin-film transistor which has high electron mobility, so that the current carrying capacity and the response speed of the second display region AA2 can be improved.

With continued reference to FIG. 3 or FIG. 5, the data write module 40 includes a sixth transistor M6, a gate of the sixth transistor M6 is connected to the first signal control terminal S1, a first electrode of the sixth transistor M6 is connected to the data signal terminal Vdata, and a second electrode of the sixth transistor M6 is connected to the second node N2.

In an embodiment, the sixth transistor M6 is a low-temperature poly-silicon thin-film transistor. In an embodiment, the sixth transistor M6 is a P-type transistor or an N-type transistor. If the sixth transistor M6 is a P-type transistor, the sixth transistor M6 is turned on when the gate of the sixth transistor M6 receives a low-level signal, and the sixth transistor M6 is turned off when the gate of the sixth transistor M6 receives a high-level signal; if the sixth transistor M6 is an N-type transistor, the sixth transistor M6 is turned on when the gate of the sixth transistor M6 receives a high-level signal, and the sixth transistor M6 is turned off when the gate of the sixth transistor M6 receives a low-level signal. The embodiments shown by FIG. 3 and FIG. 5 only illustrate examples where the sixth transistor M6 is a P-type transistor. In some other embodiments of the present disclosure, the sixth transistor M6 may be embodied as an N-type transistor, which is not limited in the present disclosure.

With continued reference to FIG. 2 or FIG. 4, the pixel driver circuit 200 further includes a power supply voltage write module 50, a control terminal of the power supply voltage write module 50 is connected to the switch signal control terminal Emit, a first terminal of the power supply voltage write module 50 is connected to the first power supply signal terminal PVDD, and a second terminal of the power supply voltage write module 50 is connected to the second node N2; the power supply voltage write module 50 is configured to write a first voltage signal, which is output from the first power supply signal terminal PVDD, to the drive transistor M0 in the light emission stage.

In the embodiment of the present disclosure, the power supply voltage write module 50 is connected in series between the first power supply signal terminal PVDD and the second node N2, and the control terminal of the power supply voltage write module 50 is connected to the switch signal control terminal Emit. The power supply voltage write module 50 is turned on or turned off according to the signal of the switch signal control terminal Emit. When the power supply voltage write module 50 is turned on, the first voltage signal of the first power supply signal terminal PVDD is transmitted to the second node N2 of the drive transistor M0 through the power supply voltage write module 50. In the embodiment of the present disclosure, the control terminal of the power supply voltage write module 50 is connected to the switch signal control terminal Emit, and thus it is not necessary to set an additional signal control terminal for the power supply voltage write module 50, which is conducive to simplifying the structure of the pixel driver circuit 200 and the overall structure of the display panel 100.

With continued reference to FIG. 3 or FIG. 5, the power supply voltage write module 50 includes a seventh transistor M7, a gate of the seventh transistor M7 is connected to the switch signal control terminal Emit, a first electrode of the seventh transistor M7 is connected to the first power supply signal terminal PVDD, and a second electrode of the seventh transistor M7 is connected to the second node N2.

In an embodiment, the seventh transistor M7 is a low-temperature poly-silicon thin-film transistor. In an embodiment, the seventh transistor M7 is a P-type transistor or an N-type transistor. If the seventh transistor M7 is a P-type transistor, the seventh transistor M7 is turned on when the gate of the seventh transistor M7 receives a low-level signal, and the seventh transistor M7 is turned off when the gate of the seventh transistor M7 receives a high-level signal; if the seventh transistor M7 is an N-type transistor, the seventh transistor M7 is turned on when the gate of the seventh transistor M7 receives a high-level signal, and the seventh transistor M7 is turned off when the gate of the seventh transistor M7 receives a low-level signal. The embodiments shown by FIG. 3 and FIG. 5 only illustrate examples where the seventh transistor M7 is a P-type transistor. In some other embodiments of the present disclosure, the seventh transistor M7 may be embodied as an N-type transistor, which is not limited in the present disclosure. An example where the seventh transistor M7 is a P-type transistor is illustrated. In the light emission stage of the pixel driver circuit 200, the switch signal control terminal Emit outputs a low-level signal, the gate of the seventh transistor M7 receives the low-level signal, the seventh transistor M7 is turned on, and the first voltage signal is transmitted to the second node N2 through the seventh transistor M7, so that the first voltage signal is provided for the drive transistor M0 and a drive current for driving the light-emitting element D1 to emit light is generated.

Referring to any one of FIG. 2 to FIG. 5, the pixel driver circuit 200 further includes a storage capacitor Cst, a first electrode of the storage capacitor Cst is connected to the first power supply signal terminal PVDD, and a second electrode of the storage capacitor Cst is connected to the first node N1; the storage capacitor Cst is configured to keep the potential of the first node N1.

The storage capacitor Cst is connected in series between the first power supply signal terminal PVDD and the first node N1. The storage function of the storage capacitor Cst compensates for the voltage change of the first node N1 caused by the leakage current, so that the voltage of the first node N1 is ensured and the display quality of the display panel 100 is improved.

Figure 6:
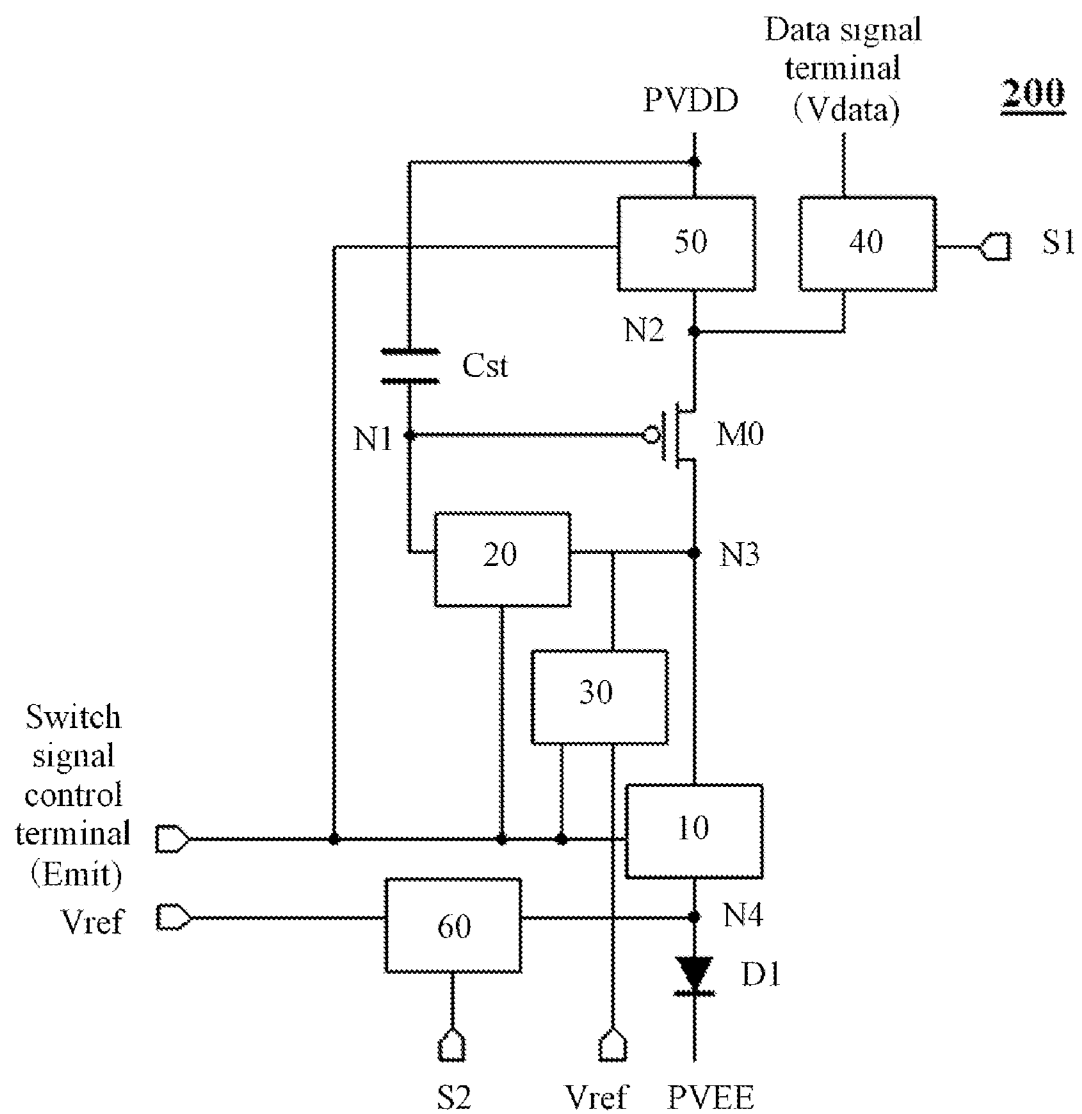
FIG. 6 is a diagram illustrating the frame structure of another pixel driver circuit according to an embodiment of the present disclosure.
Figure 7:
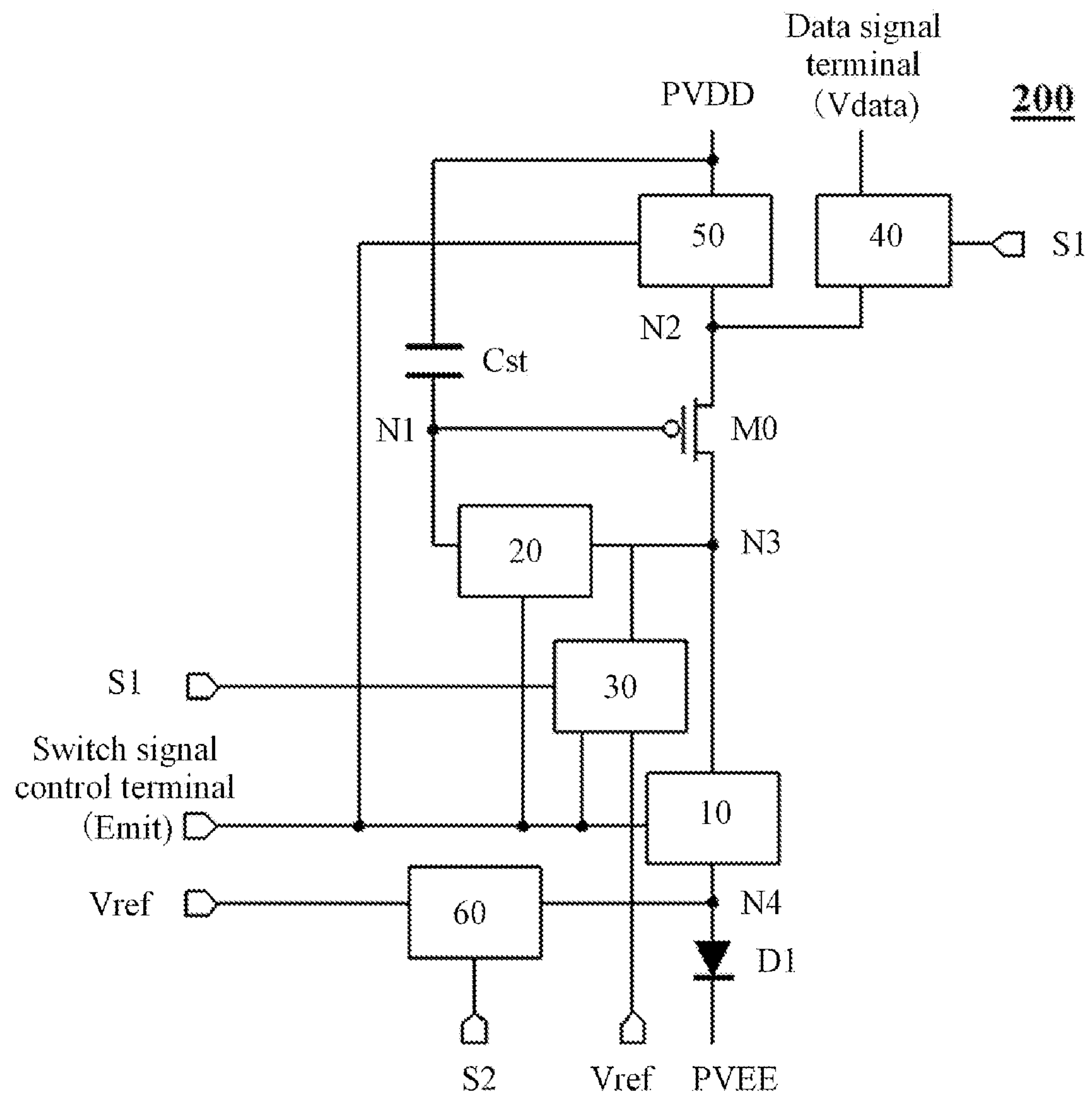
FIG. 7 is a diagram illustrating the frame structure of another pixel driver circuit according to an embodiment of the present disclosure.

FIG. 6 is a diagram illustrating the frame structure of another pixel driver circuit 200 according to an embodiment of the present disclosure, and FIG. 7 is a diagram illustrating the frame structure of another pixel driver circuit 200 according to an embodiment of the present disclosure. The embodiment shows a solution where a second reset module 60 is introduced to the pixel driver circuit 200. FIG. 6 and FIG. 7 differ in the composition of the first reset module 30.

Referring to FIG. 6 and FIG. 7, in an embodiment of the present disclosure, the pixel driver circuit 200 further includes a second reset module 60, a control terminal of the second reset module 60 is connected to a second signal control terminal S2, a first terminal of the second reset module 60 is connected to the reset signal terminal Vref, and a second terminal of the second reset module 60 is connected to the first terminal of the light-emitting element D1; in the initialization stage, the second reset module 60 is configured to reset the fourth node N4.

The second reset module 60 is connected in series between the reset signal terminal Vref and the fourth node N4, and the control terminal of the second reset module 60 is connected to the second signal control terminal S2. The second reset module 60 is turned on or turned off according to a signal of the second signal control terminal S2. When the second reset module 60 is turned on, the fourth node N4 is reset, so that the anode of the light-emitting element D1 is reset.

Figure 8:
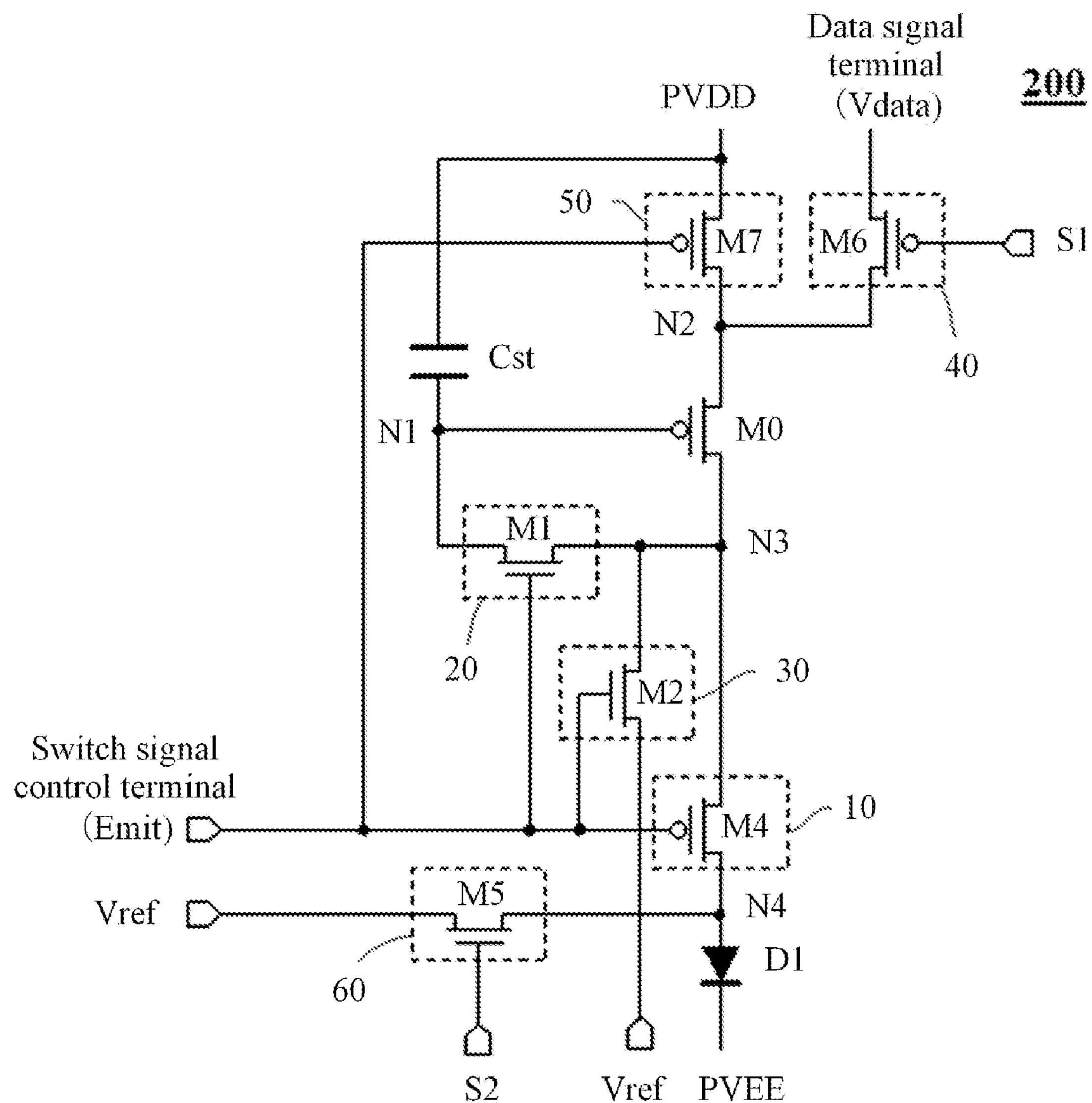
FIG. 8 is a circuit diagram of another pixel driver circuit according to an embodiment of the present disclosure.
Figure 9:
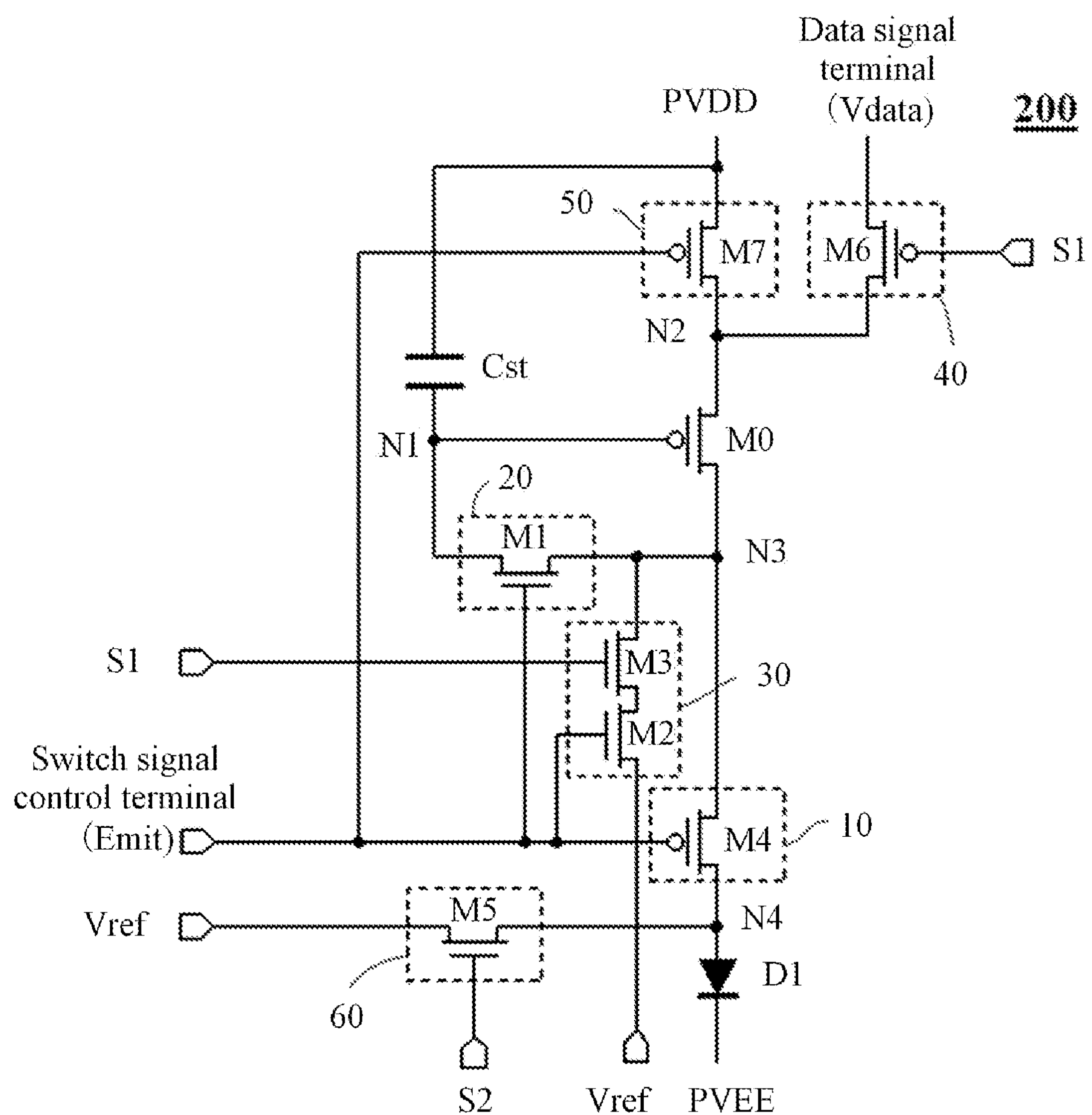
FIG. 9 is a circuit diagram of another pixel driver circuit according to an embodiment of the present disclosure.

FIG. 8 is a circuit diagram of another pixel driver circuit 200 according to an embodiment of the present disclosure, and FIG. 9 is a circuit diagram of another pixel driver circuit 200 according to an embodiment of the present disclosure. FIG. 8 is a refinement of the structure of FIG. 6, while FIG. 9 is a refinement of the structure of FIG. 7. Embodiments shown by FIG. 8 and FIG. 9 both refine the structure of the pixel driver circuit 200, differing in the composition of the first reset module 30.

Referring to FIG. 8 and FIG. 9, in an embodiment of the present disclosure, the second reset module 60 includes a fifth transistor M5, a gate of the fifth transistor M5 is connected to the second signal control terminal S2, a first electrode of the fifth transistor M5 is connected to the reset signal terminal Vref, and a second electrode of the fifth transistor M5 is connected to the first terminal of the light-emitting element D1; the fifth transistor M5 is a low-temperature polycrystalline oxide thin-film transistor.

The fifth transistor M5 is a low-temperature polycrystalline oxide thin-film transistor. The low-temperature polycrystalline oxide thin-film transistor is turned on when the gate of the low-temperature polycrystalline oxide thin-film transistor receives a high-level signal and is turned off when the gate of the low-temperature polycrystalline oxide thin-film transistor receives a low-level signal. The gate of the fifth transistor M5 is the control terminal of the second reset module 60, and the gate of the fifth transistor M5 is connected to the second signal control terminal S2. In the initialization stage of the pixel driver circuit 200, the second signal control terminal S2 outputs a high-level signal, the gate of the fifth transistor M5 receives the high-level signal, thus the fifth transistor M5 is turned on, and the reset signal sent by the reset signal terminal Vref is transmitted to the fourth node N4 through the fifth transistor M5, so that the fourth node N4 is reset.

In the embodiment of the present disclosure, the fifth transistor M5 is used for composing the second reset module 60 in the present disclosure, so that the structure is simple. Therefore, the fourth node N4 can be reset, a residual voltage of the fourth node N4 in the last time of light emission can be cleared, and thus the light-emitting element D1 can emit light at preset brightness. Therefore, the circuit structure of the pixel driver circuit 200 can be simplified while the accuracy of the light emission brightness of the light-emitting element D1 can be improved. Moreover, the fifth transistor M5 is a low-temperature polycrystalline oxide thin-film transistor with characteristics such as high transmittance and low power consumption, so that the transmittance of the second display region AA2 can be improved. In the photosensitive stage, more light passes through the second display region AA2 to reach the photosensitive element G, which is conducive to improving the photosensitive performance of the display panel 100.

Figure 10:
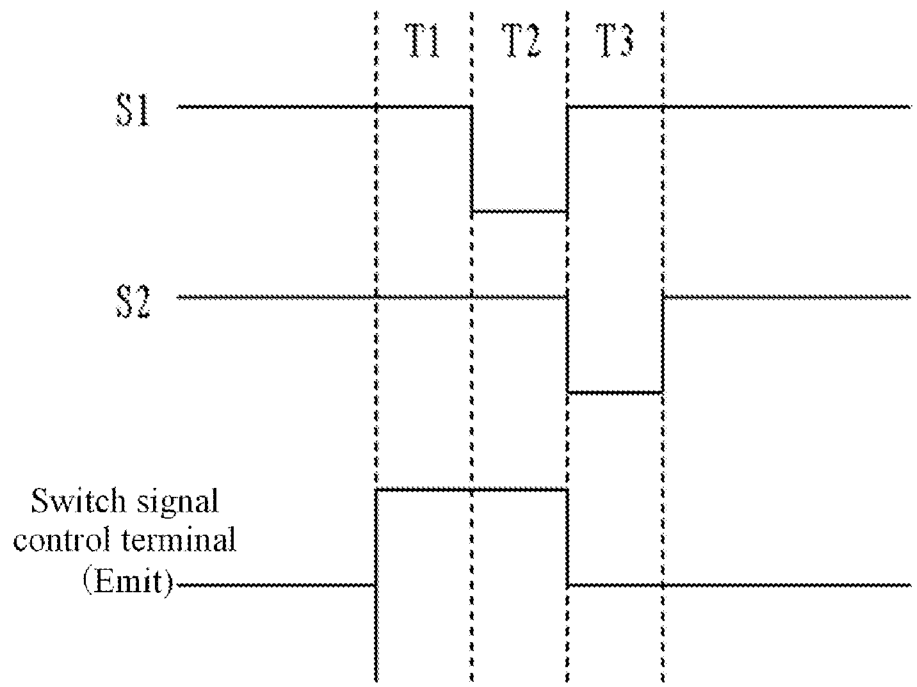
FIG. 10 is a timing diagram of a pixel driver circuit according to an embodiment of the present disclosure.
Figure 11:
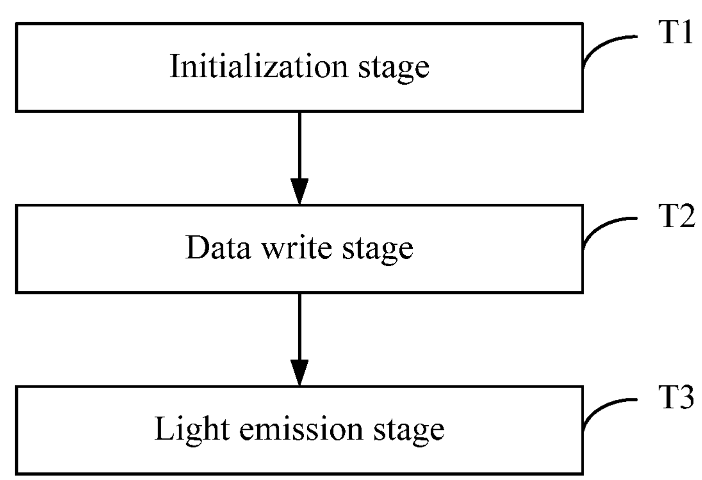
FIG. 11 is a flowchart of a driving method of a display panel according to an embodiment of the present disclosure.

An embodiment of the present disclosure further provides a driving method of a display panel, which is used for driving the display panel 100 according to any one of the preceding embodiments. Referring to FIG. 10 and FIG. 11, FIG. 10 is a timing diagram of a pixel driver circuit according to an embodiment of the present disclosure, and FIG. 11 is a flowchart of a driving method of a display panel according to an embodiment of the present disclosure.

Referring to FIG. 1 to FIG. 9, the display panel 100 includes a compensation module 20, a first reset module 30, a data write module 40, a drive transistor M0, a power supply voltage write module 50, a light emission control module 10 and a light-emitting element D1.

The driving method includes an initialization stage T1, a data write stage T2 and a light emission stage T3.

In the initialization stage T1, the compensation module 20 and the first reset module 30 are turned on, and the first reset module 30 and the compensation module 20 transmit a reset signal of a reset signal terminal Vref to a first node N1 to reset the first node N1.

In the data write stage T2, the data write module 40 and the compensation module 20 are turned on, a data signal of a data signal terminal Vdata is transmitted through the data write module 40 to a second node N2, a signal of the second node N2 is transmitted through the drive transistor M0 to a third node N3, and a signal of the third node N3 is transmitted through the compensation module 20 to the first node N1.

In the light emission stage T3, the power supply voltage write module 50 and the light emission control module 10 are turned on, the power supply voltage write module 50 transmits a first voltage signal of a first power supply signal terminal PVDD to the second node N2, and then the drive transistor M0 generates a current and transmits the current to the light-emitting element D1.

Referring to FIG. 9 and FIG. 10, an example where a first transistor M1, a second transistor M2, a third transistor M3 and a fifth transistor M5 are low-temperature polycrystalline oxide thin-film transistors, and other transistors are P-type transistors is used for illustrating the working timing of the pixel driver circuit 200.

In the initialization stage T1, a first signal control terminal S1 outputs a high-level signal, a second signal control terminal S2 outputs a high-level signal, and a switch signal control terminal Emit outputs a high-level signal. The compensation module 20 and the first reset module 30 are turned on, and the first reset module 30 and the compensation module 20 transmit the reset signal of the reset signal terminal Vref to the first node N1 to reset the first node N1. In the initialization stage T1, the first node N1 can be reset, a residual voltage of the first node N1 in the last time of light emission can be cleared, and thus the light-emitting element D1 can emit light at preset brightness, which is conducive to improving the accuracy of the light emission brightness of the light-emitting element D1.

In the data write stage T2, the first signal control terminal S1 outputs a low-level signal, the second signal control terminal S2 outputs a high-level signal, and the switch signal control terminal Emit outputs a high-level signal. The data write module 40, the drive transistor M0 and the compensation module 20 are turned on, the data signal of the data signal terminal Vdata is transmitted to the second node N2 through the data write module 40, a signal of the second node N2 is transmitted to the third node N3 through the drive transistor M0, and a signal of the third node N3 is transmitted to the first node N1 through the compensation module 20.

In the light emission stage T3, the first signal control terminal S1 outputs a high-level signal, the second signal control terminal S2 outputs a low-level signal, and the switch signal control terminal Emit outputs a low-level signal. The power supply voltage write module 50 and the light emission control module 10 are turned on, the power supply voltage write module 50 transmits the first voltage signal of the first power supply signal terminal PVDD to the second node N2, and then the drive transistor M0 generates a current and transmits the current to the light-emitting element D1. In the light emission stage T3, the drive transistor M0 generates a drive current for driving the light-emitting element D1 to emit light according to the data signal written in the data write stage T2 and the signal of the first power supply signal terminal PVDD.

In an embodiment, the first reset module 30 and the compensation module 20 in the pixel driver circuit 200 both use low-temperature polycrystalline oxide thin-film transistors so that the transmittance of the second display region AA2 is effectively improved.

In an embodiment of the present disclosure, the display panel 100 further includes a second reset module 60.

The driving method further includes the step described below.

In the initialization stage T1, the second reset module 60 is turned on, and the second reset module 60 transmits the reset signal to the fourth node N4 to reset the fourth node N4.

With continued reference to FIG. 9, an example where the transistor in the second reset module 60 is a low-temperature polycrystalline oxide thin-film transistor is illustrated in the embodiment. The low-temperature polycrystalline oxide thin-film transistor is turned on when the gate of the low-temperature polycrystalline oxide thin-film transistor receives a high-level signal and is turned off when the gate of the low-temperature polycrystalline oxide thin-film transistor receives a low-level signal.

In the initialization stage T1, the first signal control terminal S1 outputs a high-level signal, the second signal control terminal S2 outputs a high-level signal, and the switch signal control terminal Emit outputs a high-level signal. The second reset module 60 is turned on, and the second reset module 60 transmits the reset signal to the fourth node N4 to reset the fourth node N4. In the initialization stage T1, a residual voltage of the fourth node N4 in the last time of light emission can be cleared, and thus the light-emitting element D1 can emit light at preset brightness.

Figure 12:
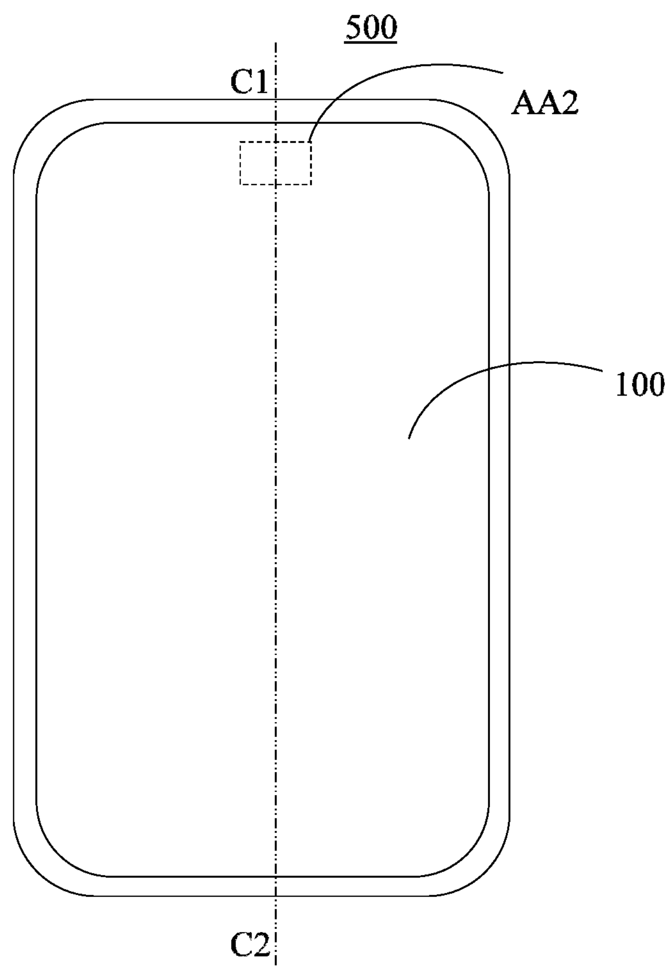
FIG. 12 is a structural diagram of a display device according to an embodiment of the present disclosure.

The present disclosure further provides a display device. Referring to FIG. 12, FIG. 12 is a structural diagram of a display device according to an embodiment of the present disclosure. The display device 500 provided in the embodiment includes the display panel 10 provided in any one of the preceding embodiments of the present disclosure.

The display device 500 provided in the embodiment of the present disclosure may be a computer, a mobile phone, a tablet computer or another display device with a display function, which is not limited in the present disclosure. The display device provided in the embodiment of the present disclosure has the effects of the display panel provided in the embodiments of the present disclosure. Reference may be made to the description of the display panel in the preceding embodiments, which is not repeated here in the embodiment.

Figure 13:
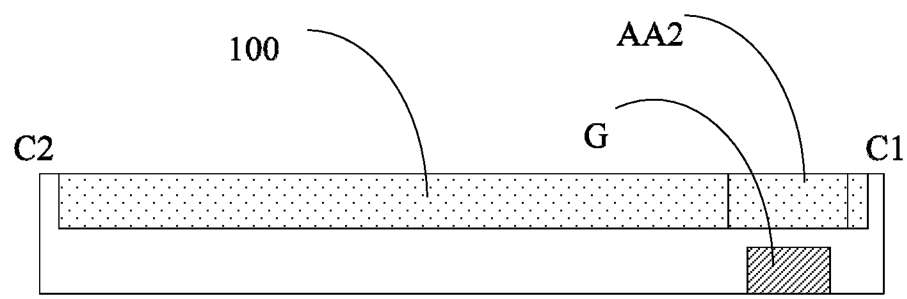
FIG. 13 is a sectional view taken along direction C1-C2 of the display device shown in FIG. 12.

In an implementation of the present disclosure, with continued reference to FIG. 12 and FIG. 13, the display device 500 provided in the embodiment of the present disclosure further includes a photosensitive element G, and the photosensitive element G is located in a second display region AA2 of the display panel 100. In an embodiment, the photosensitive element G included in the display device 500 is an electronic photosensitive device such as a camera, an infrared sensing device and a fingerprint recognition device. In a display stage, the second display region AA2 plays the display function; in a photosensitive stage, the photosensitive element G in the second display region AA2 is configured to sense light.

The display panel 100 provided in the embodiment of the present disclosure may be applied to a display device and the display device may be embodied as any product or component having a display function, such as a mobile phone, a tablet computer, a television, a display, a notebook computer, a digital photo frame or a navigator.

To sum up, the display panel and the driving method thereof and the display device provided in the present disclosure achieve at least the effects described below.

In the embodiment of the present disclosure, multiple subpixels which are arranged in an array are disposed in both the first display region AA1 and the second display region AA2, and each subpixel includes a pixel driver circuit 200. In an embodiment, the second display region AA2 is configured to set up an electronic photosensitive device such as a camera, an infrared sensing device and a fingerprint recognition device. At least some transistors of multiple transistors in a pixel driver circuit 200 in the second display region AA2 are low-temperature polycrystalline oxide thin-film transistors. The low-temperature polycrystalline oxide thin-film transistor has relatively high transmittance. Therefore, when the second display region AA2 is used for light recognition, such as when taking photos is performed, the second display region AA2 can become like transparent glass, allowing light to pass through the second display region AA2 and reach the photosensitive element G disposed below the second display region AA2, so that the imaging function is achieved. When the second display region AA2 is used for display, the second display region AA2 can be used for display together with the first display region AA1, which is conducive to improving the screen-to-body ratio. The manner of replacing at least some transistors in the second display region AA2 with low-temperature polycrystalline oxide thin-film transistors effectively improves the transmittance of the second display region AA2, which is conducive to improving the photosensitive performance of the second display region AA2.

What is claimed is:

1. A display panel, comprising a first display region and a second display region, wherein the first display region and the second display region each comprise a plurality of subpixels which are arranged in an array, and each subpixel of the plurality of subpixels comprises a pixel driver circuit, wherein the second display region corresponds to a photosensitive element;

wherein each pixel driver circuit located in the second display region comprises at least one transistor, and at least one transistor of the at least one transistor is a low-temperature polycrystalline oxide thin-film transistor;

wherein the pixel driver circuit comprises:

a first power supply signal terminal and a second power supply signal terminal, wherein the first power supply signal terminal is configured to receive a first voltage signal, and the second power supply signal terminal is configured to receive a second voltage signal;

a drive transistor, wherein a gate of the drive transistor is connected to a first node, a first electrode of the drive transistor is connected to a second node, and a second electrode of the drive transistor is connected to a third node; the drive transistor is configured to provide a drive current in a light emission stage;

a light emission control module, wherein a control terminal of the light emission control module is connected to a switch signal control terminal, a first terminal of the light emission control module is connected to the third node, and a second terminal of the light emission control module is connected to a fourth node;

a light-emitting element, wherein a first terminal of the light-emitting element is connected to the second terminal of the light emission control module through the fourth node, and a second terminal of the light-emitting element is connected to the second power supply signal terminal; the light-emitting element is configured to, in response to the drive current, emit light under control of the light emission control module;

a compensation module, wherein a control terminal of the compensation module is connected to the switch signal control terminal, a first terminal of the compensation module is connected to the first node, and a second terminal of the compensation module is connected to the third node: the compensation module is configured to detect and self-compensate for a deviation of a threshold voltage of the drive transistor in a compensation stage; and a first reset module, wherein a control terminal of the first reset module is connected to the switch signal control terminal, a first terminal of the first reset module is connected to the third node, and a second terminal of the first reset module is connected to a reset signal terminal; the first reset module and the compensation module are jointly configured to reset the first node in an initialization stage;

wherein the compensation module comprises a first transistor, a gate of the first transistor is connected to the switch signal control terminal, a first electrode of the first transistor is connected to the first node, and a second electrode of the first transistor is connected to the third node;

the first reset module comprises a second transistor and a third transistor, a gate of the second transistor is connected to the switch signal control terminal, a first electrode of the second transistor is connected to a second electrode of the third transistor, a second electrode of the second transistor is connected to the reset signal terminal, a gate of the third transistor is connected to a first signal control terminal, and a first electrode of the third transistor is connected to the third node;

wherein the first transistor, the second transistor, and the third transistor are each a low-temperature polycrystalline oxide thin-film transistor.

2. The display panel according to claim 1, wherein the light emission control module comprises a fourth transistor, a gate of the fourth transistor is connected to the switch signal control terminal, a first electrode of the fourth transistor is connected to the third node, and a second electrode of the fourth transistor is connected to the fourth node.

3. The display panel according to claim 1, wherein the pixel driver circuit further comprises a second reset module, a control terminal of the second reset module is connected to a second signal control terminal, a first terminal of the second reset module is connected to the reset signal terminal, and a second terminal of the second reset module is connected to the first terminal of the light-emitting element; the second reset module is configured to reset the fourth node in the initialization stage.

4. The display panel according to claim 3, wherein the second reset module comprises a fifth transistor, a gate of the fifth transistor is connected to the second signal control terminal, a first electrode of the fifth transistor is connected to the reset signal terminal, and a second electrode of the fifth transistor is connected to the first terminal of the light-emitting element; the fifth transistor is a low-temperature polycrystalline oxide thin-film transistor.

5. The display panel according to claim 1, wherein the pixel driver circuit further comprises a data write module, a control terminal of the data write module is connected to the first signal control terminal, a first terminal of the data write module is connected to a data signal terminal, and a second terminal of the data write module is connected to the second node; the data write module is configured to provide a data signal for the drive transistor.

6. The display panel according to claim 5, wherein the data write module comprises a sixth transistor, a gate of the sixth transistor is connected to the first signal control terminal, a first electrode of the sixth transistor is connected to the data signal terminal, and a second electrode of the sixth transistor is connected to the second node.

7. The display panel according to claim 1, wherein the pixel driver circuit further comprises a power supply voltage write module, a control terminal of the power supply voltage write module is connected to the switch signal control terminal, a first terminal of the power supply voltage write module is connected to the first power supply signal terminal, and a second terminal of the power supply voltage write module is connected to the second node; the power supply voltage write module is configured to write the first voltage signal, which is output from the first power supply signal terminal, to the drive transistor in the light emission stage.

8. The display panel according to claim 7, wherein the power supply voltage write module comprises a seventh transistor, a gate of the seventh transistor is connected to the switch signal control terminal, a first electrode of the seventh transistor is connected to the first power supply signal terminal, and a second electrode of the seventh transistor is connected to the second node.

9. The display panel according to claim 1, wherein the pixel driver circuit further comprises a storage capacitor, a first electrode of the storage capacitor is connected to the first power supply signal terminal, and a second electrode of the storage capacitor is connected to the first node; the storage capacitor is configured to keep a potential of the first node.

10. A driving method of a display panel, comprising:

in an initialization stage, turning on a compensation module and a first reset module which are comprised in a pixel driver circuit, and transmitting, by the first reset module and the compensation module, a reset signal of a reset signal terminal to a first node to reset the first node;

in a data write stage, turning on a data write module and the compensation module which are comprised in the pixel driver circuit, transmitting, through a second terminal of the data write module, a data signal of a data signal terminal connected by a first terminal of the data write module to a second node, transmitting, through a drive transistor comprised in the pixel driver circuit, a signal of the second node to a third node, and transmitting, through the compensation module, a signal of the third node to the first node; and in a light emission stage, turning on a power supply voltage write module and a light emission control module which are comprised in the pixel driver circuit, and transmitting, by the power supply voltage write module, a first voltage signal of a first power supply signal terminal comprised in the pixel driver circuit to the second node to drive the drive transistor to generate a current and transmit the current to a light-emitting element comprised in the pixel driver circuit;

wherein the display panel comprises a first display region and a second display region, the first display region and the second display region each comprise a plurality of subpixels which are arranged in an array, and each subpixel of the plurality of subpixels comprises a pixel driver circuit, wherein the second display region corresponds to a photosensitive element;

wherein each pixel driver circuit located in the second display region comprises at least one transistor, and at least one transistor of the at least one transistor is a low-temperature polycrystalline oxide thin-film transistor;

wherein the pixel driver circuit comprises:

the first power supply signal terminal and a second power supply signal terminal, wherein the first power supply signal terminal is configured to receive the first voltage signal, and the second power supply signal terminal is configured to receive a second voltage signal;

the drive transistor, wherein a gate of the drive transistor is connected to the first node, a first electrode of the drive transistor is connected to the second node, and a second electrode of the drive transistor is connected to the third node; the drive transistor is configured to provide a drive current in the light emission stage;

the light emission control module, wherein a control terminal of the light emission control module is connected to a switch signal control terminal, a first terminal of the light emission control module is connected to the third node, and a second terminal of the light emission control module is connected to a fourth node;

the light-emitting element, wherein a first terminal of the light-emitting element is connected to the second terminal of the light emission control module through the fourth node, and a second terminal of the light-emitting element is connected to the second power supply signal terminal; the light-emitting element is configured to, in response to the drive current, emit light under control of the light emission control module;

the compensation module, wherein a control terminal of the compensation module is connected to the switch signal control terminal, a first terminal of the compensation module is connected to the first node, and a second terminal of the compensation module is connected to the third node; the compensation module is configured to detect and self-compensate for a deviation of a threshold voltage of the drive transistor in a compensation stage; and the first reset module, wherein a control terminal of the first reset module is connected to the switch signal control terminal, a first terminal of the first reset module is connected to the third node, and a second terminal of the first reset module is connected to a reset signal terminal; the first reset module and the compensation module are jointly configured to reset the first node in the initialization stage;

wherein the compensation module comprises a first transistor, a gate of the first transistor is connected to the switch signal control terminal, a first electrode of the first transistor is connected to the first node, and a second electrode of the first transistor is connected to the third node;

the first reset module comprises a second transistor and a third transistor, a gate of the second transistor is connected to the switch signal control terminal, a first electrode of the second transistor is connected to a second electrode of the third transistor, a second electrode of the second transistor is connected to the reset signal terminal, a gate of the third transistor is connected to a first signal control terminal, and a first electrode of the third transistor is connected to the third node;

wherein the first transistor, the second transistor, and the third transistor are each a low-temperature polycrystalline oxide thin-film transistor.

11. The method according to claim 10, wherein the pixel driver circuit further comprises a second reset module; and the method further comprises:

in the initialization stage, turning on the second reset module, and transmitting, by the second reset module, the reset signal to the fourth node to reset the fourth node.

12. A display device, comprising a display panel, wherein the display panel comprises a first display region and a second display region, the first display region and the second display region each comprise a plurality of subpixels which are arranged in an array, and each subpixel of the plurality of subpixels comprises a pixel driver circuit, wherein the second display region corresponds to a photosensitive element;

wherein each pixel driver circuit located in the second display region comprises at least one transistor, and at least one transistor of the at least one transistor is a low-temperature polycrystalline oxide thin-film transistor;

wherein the display device further comprises the photosensitive element, and the photosensitive element is located in the second display region of the display panel;

wherein the pixel driver circuit comprises:

a first power supply signal terminal and a second power supply signal terminal, wherein the first power supply signal terminal is configured to receive a first voltage signal, and the second power supply signal terminal is configured to receive a second voltage signal;

a drive transistor, wherein a gate of the drive transistor is connected to a first node, a first electrode of the drive transistor is connected to a second node, and a second electrode of the drive transistor is connected to a third node; the drive transistor is configured to provide a drive current in a light emission stage;

a light emission control module, wherein a control terminal of the light emission control module is connected to a switch signal control terminal, a first terminal of the light emission control module is connected to the third node, and a second terminal of the light emission control module is connected to a fourth node;

a light-emitting element, wherein a first terminal of the light-emitting element is connected to the second terminal of the light emission control module through the fourth node, and a second terminal of the light-emitting element is connected to the second power supply signal terminal; the light-emitting element is configured to, in response to the drive current, emit light under control of the light emission control module;

a compensation module, wherein a control terminal of the compensation module is connected to the switch signal control terminal, a first terminal of the compensation module is connected to the first node, and a second terminal of the compensation module is connected to the third node; the compensation module is configured to detect and self-compensate for a deviation of a threshold voltage of the drive transistor in a compensation stage; and a first reset module, wherein a control terminal of the first reset module is connected to the switch signal control terminal, a first terminal of the first reset module is connected to the third node, and a second terminal of the first reset module is connected to a reset signal terminal; the first reset module and the compensation module are jointly configured to reset the first node in an initialization stage;

wherein the compensation module comprises a first transistor, a gate of the first transistor is connected to the switch signal control terminal, a first electrode of the first transistor is connected to the first node, and a second electrode of the first transistor is connected to the third node;

the first reset module comprises a second transistor and a third transistor, a gate of the second transistor is connected to the switch signal control terminal, a first electrode of the second transistor is connected to a second electrode of the third transistor, and a second electrode of the second transistor is connected to the reset signal terminal, a gate of the third transistor is connected to a first signal control terminal, and a first electrode of the third transistor is connected to the third node;

wherein the first transistor, the second transistor, and the third transistor are each a low-temperature polycrystalline oxide thin-film transistor.

13. The display device according to claim 12, wherein the light emission control module comprises a fourth transistor, a gate of the fourth transistor is connected to the switch signal control terminal, a first electrode of the fourth transistor is connected to the third node, and a second electrode of the fourth transistor is connected to the fourth node.

14. The display device according to claim 12, wherein the pixel driver circuit further comprises a second reset module, a control terminal of the second reset module is connected to a second signal control terminal, a first terminal of the second reset module is connected to the reset signal terminal, and a second terminal of the second reset module is connected to the first terminal of the light-emitting element; the second reset module is configured to reset the fourth node in the initialization stage.

15. The display device according to claim 14, wherein the second reset module comprises a fifth transistor, a gate of the fifth transistor is connected to the second signal control terminal, a first electrode of the fifth transistor is connected to the reset signal terminal, and a second electrode of the fifth transistor is connected to the first terminal of the light-emitting element; the fifth transistor is a low-temperature polycrystalline oxide thin-film transistor.

16. The display device according to claim 12, wherein the pixel driver circuit further comprises a data write module, a control terminal of the data write module is connected to the first signal control terminal, a first terminal of the data write module is connected to a data signal terminal, and a second terminal of the data write module is connected to the second node; the data write module is configured to provide a data signal for the drive transistor.

17. The display device according to claim 16, wherein the data write module comprises a sixth transistor, a gate of the sixth transistor is connected to the first signal control terminal, a first electrode of the sixth transistor is connected to the data signal terminal, and a second electrode of the sixth transistor is connected to the second node.

18. The display device according to claim 12, wherein the pixel driver circuit further comprises a power supply voltage write module, a control terminal of the power supply voltage write module is connected to the switch signal control terminal, a first terminal of the power supply voltage write module is connected to the first power supply signal terminal, and a second terminal of the power supply voltage write module is connected to the second node; the power supply voltage write module is configured to write the first voltage signal, which is output from the first power supply signal terminal, to the drive transistor in the light emission stage.

19. The display device according to claim 18, wherein the power supply voltage write module comprises a seventh transistor, a gate of the seventh transistor is connected to the switch signal control terminal, a first electrode of the seventh transistor is connected to the first power supply signal terminal, and a second electrode of the seventh transistor is connected to the second node.

20. The display device according to claim 12, wherein the pixel driver circuit further comprises a storage capacitor, a first electrode of the storage capacitor is connected to the first power supply signal terminal, and a second electrode of the storage capacitor is connected to the first node; the storage capacitor is configured to keep a potential of the first node.

* * * * *